United States Patent [19]

Gloth et al.

[11] 3,983,091

[45] Sept. 28, 1976

[54] PHENOLIC ANTIOXIDANTS PREPARED FROM TRICYCLOPENTADIENE AND STABILIZED COMPOSITIONS

[75] Inventors: Richard H. Gloth, Copley; James J. Tazuma, Stow, both of Ohio

[73] Assignee: The Goodyear Tire & Rubber Company, Akron, Ohio

[22] Filed: July 25, 1975

[21] Appl. No.: 599,212

[52] U.S. Cl. .................. 260/45.95 H; 260/45.95 R; 260/619 B; 260/619 D; 260/621 R
[51] Int. Cl.² ..................... C08K 5/13; C07C 37/12; C07C 37/00; C07C 39/18
[58] Field of Search .............. 260/45.95 R, 45.95 H, 260/621, 619 D, 619 B

[56] References Cited
UNITED STATES PATENTS

| | | | |
|---|---|---|---|
| 2,581,907 | 1/1952 | Smith et al. | 260/619 D |
| 2,650,208 | 8/1953 | Arey et al. | 260/45.95 R |
| 2,864,868 | 12/1958 | Bader | 260/619 D |
| 3,036,138 | 5/1962 | Mingasson et al. | 260/619 D |
| 3,935,281 | 1/1976 | Cottman | 260/45.95 H |

*Primary Examiner*—V. P. Hoke
*Attorney, Agent, or Firm*—F. W. Brunner; J. A. Rozmajzl

[57] ABSTRACT

Phenolic antioxidants useful in the stabilization of oxidizable polymers such as polybutadiene, butadiene/styrene copolymers and polypropylene are prepared by reacting simple phenolic compounds with tricyclopentadiene.

5 Claims, No Drawings

PHENOLIC ANTIOXIDANTS PREPARED FROM TRICYCLOPENTADIENE AND STABILIZED COMPOSITIONS

This invention relates to phenolic antioxidants for oxidizable polymers. More particularly it relates to reaction products of various phenolic compounds with tricyclopentadiene (TCPD).

Those interested in stabilizing oxidizable polymers against oxidative degradation are constantly searching for new and effective antioxidants. When polymer color is important, it is desirable that the antioxidant be relatively non-discoloring. A problem that is not successfully solved by many of the previously known phenolic stabilizers is that they are in varying degrees too readily volatilized, and therefore escape from the materials which they are intended to stabilize during the rather extended service life to which such materials are subjected.

It is therefore an object of this invention to provide a new class of phenolic antioxidants which can be used as stabilizers for organic compounds and which stabilizers are relatively nondiscoloring and nonvolatile in polymers. Other objects will become apparent as this description proceeds.

In accordance with the present invention it has been found that the foregoing and additional object can be accomplished by employing as stabilizers for polymeric materials which are subject to the deleterious effects of oxygen, ozone and sunlight, reaction products of a phenol and tricyclopentadiene (TCPD). The reaction products may be subsequently alkylated with a tertiary olefin if desired. The latter method will be referred to herein as the two-step method and the former method as the one-step method. The reaction products are relatively nondiscoloring antioxidants with relatively low volatility.

In the one-step method the reaction product is prepared by reacting a mixture comprising (A) at least one phenol conforming to the following structural formula

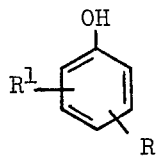

wherein R is selected from the group consisting of hydrogen, alkyl radicals having from 1 to 12 carbon atoms, cycloalkyl radicals having from 5 to 12 carbon atoms, aralkyl radicals having from 7 to 12 carbon atoms, substituted and unsubstituted aryl radicals having 6 to 12 carbon atoms, alkoxy radicals having from 1 to 12 carbon atoms, cycloalkoxy radicals having from 5 to 12 carbon atoms and aralkoxy radicals having from 7 to 12 carbon atoms and $R^1$ is selected from the group consisting of hydrogen and tertiary alkyl radicals having from 4 to 12 carbon atoms and (B) the TCPD.

In the two-step process $R^1$ is hydrogen and the reaction product of the first step in reacted with an olefin selected from the group consisting of tertiary olefins having 4 to 12 carbon atoms (e.g., isobutylene, t-amylenes and t-hexylenes) and styrene.

Illustrative species of phenols which may be used in either the one-step or two-step processes are listed below.

phenol
o,m,p-cresol
o,m,p-isopropyl phenol
o,m,p-propyl phenol
o,m,p-ethyl phenol
o,m,p-methoxy phenol
o,m,p-ethoxy phenol
o,m,p-cyclohexyl phenol
o,m,p-benzyl phenol
o,m,p-phenoxy phenol
o,m,p-phenyl phenol
o,m,p-propoxy phenol
p-butyl phenol
p-hexyl phenol
p-oxtyl phenol
p-dodecyl phenol Illustrative species of phenols which may be used only in the one-step process are listed below.

2-tert.butyl-4-methyl phenol
2-tert.butyl-6-methyl phenol
6-tert.butyl-3-methyl phenol
2,6-ditert.butyl phenol
2-tert.butyl-4-methoxy phenol
2-tert.butyl-6-methoxy phenol
2-tert.butyl phenol
2-tert.hexyl-4-methyl phenol
2-tert.octyl-4-methyl phenol
2-tert.dodecyl-4-methyl phenol
2-tert.hexyl-4-methoxy phenol
2-tert.nonyl-4-phenoxy phenol
2-tert.pentyl-3-hexoxy phenol
2-($\alpha,\alpha$-dimethylbenzyl)-4-ethoxy phenol
2-tert.heptyl-4-cyclohexoxy phenol When the one-step process is used, preferably R is in the para position and is a methyl or ethyl radical and preferably $R^1$ is in the ortho position. When the two-step process is used and $R^1$ is hydrogen, preferably R is methyl or ethyl and is in a meta or para position.

The reaction between the diolefin and the phenolic compounds is effectively catalyzed by a Friedel-Crafts type catalyst, and in particular the more potent Friedel-Crafts catalysts such as aluminum chloride, zinc chloride, ferrous and ferric chloride and boron trifluoride, as well as complexes based on boron trifluoride.

Friedel-Crafts type catalysts include Lewis acid type acidic halides or proton acids. Friedel-Crafts catalysts and reactions are discussed in volume 1 of Friedel-Crafts and Related Reactions edited by George A. Olah, 1963, Interscience Publications, pages 25–91, and in Encyclopedia of Chemistry, 3rd. edition, Van Nostraand Reinhold Company, pages 470–471. These catalysts are illustrated by metal halides, aluminum chloride, aluminum bromide, aluminum iodide, ferric chloride, zinc chloride, zirconium chloride, boron fluorides (such as boron trifluoride and complexes thereof), acids such as sulfuric acid, aromatic sulfonic acids, phosphoric acid and hydrogen fluoride. Supported phosphoric acid, silica alumina and cation exchange resins are also included as Friedel-Crafts catalysts. Boron trifluoride and complexes based on boron trifluoride are preferred catalysts for the one-step process and the first step of the two-step process. The second step of the above described two-step reaction process, wherein the product obtained by reacting the olefin and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the two-step process. Acidic alkylation catalysts include acidic ion exchange resins. The catalysts employed in both the first stage of the two-step process and in the one-step process are employed in the customary catalytic amounts, which will normally vary from 0.1 percent to 5.0 percent of catalyst based on the weight of the TCPD in the reaction which is to be catalyzed, while that employed in the second stage of the two-step process may vary from 0.1 to 20.0 percent based on weight of the stage 1 product.

While boron trifluoride will function as an alkylation catalyst to catalyze the second step of the two-step process, it is not a particularly desirable alkylation catalyst since it tends to promote undesirable side reactions. It is therefore preferred to remove the boron trifluoride catalyst when it is employed in the first step of the reaction before proceeding with the second or alkylation step of the two-step process. The boron trifluoride catalyst may be effectively removed by destroying it with a basic material such as ammonia, or a solution of sodium hydroxide, sodium carbonate or calcium hydroxide. Alternatively the boron trifluoride catalyst may be removed along with excess phenolic materials by heating the reaction mixture to a temperature from 100° C. to 160° C. or above under vacuum. An additional method of removing the boron trifluoride catalyst employed in the first step of the two-step process and in the one-step process is by refluxing the reaction mixture from step one with a small quantity of an inert organic solvent such as toluene at a temperature between 150° C. and 160° C. or above. The acidic alkylation catalyst employed to catalyze the second step of the two-step process is normally neutralized with a suitable basic material such as a sodium carbonate solution or hydrated lime.

The reaction between the phenol and diolefin in either process is preferably conducted at a temperature from 30° C. to 160° C. Even more preferred are reaction temperatures between 80° C. and 150° C.

Illustrative species of olefins that may be used in the second step of the two-step process are listed below.

isobutylene
2,4-dimethyl-1heptene
2-methyl-1-butene
2-methyl-1-pentene
2-methyl-2-pentene
2-methyl-1-hexene
2-methyl-2-hexene
2,4,4-trimethyl-1-pentene
α-methylstyrene
2-methyl-1-nonene
2-methyl-2-octene The molar ratio of the phenolic reactant to the TCPD can vary from 1:1 to 10:1. Preferably the lower limit is 2:1 and more preferably 3:1. The preferred upper limit is 5:1 and more preferably 4:1. In some instances it may be desirable to carry out the one-step process and the first step of the two-step process in an inert organic solvent such as benzene or toluene. The employment of a solvent is particularly desirable if a relatively low ratio of phenolic compound to diolefin is used. When the molar ratio of phenolic compound to diolefin is 4:1 or higher, the excess phenolic compound acts as an effective solvent and no additional solvent need be employed. At ratios of lower than 4:1, the use of a solvent should be considered.

The one-step process and the first step of the two-step process may be carried out by adding the diolefin to the mixture of phenolic compound and catalyst or the catalyst may be added gradually to the mixture of phenolic compound and diolefin. The first of these two procedures is preferred. The rate at which the reactants are combined can vary over a wide range as long as the temperature is kept below the boiling point of the lowest boiling reactant.

The second step of the two-step process involves alkylation of the product obtained in step one. In carrying out the second step of the process the product obtained from step one is dissolved in an inert hydrocarbon solvent such as benzene, toluene, etc. Alkylation is normally conducted at a temperature between 20° C. and 100° C. A preferred temperature range is between 60° C. and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however, the time within which the reaction is completed is dependent upon the activity of the alkylating agent used.

The amount of olefin used in the second step will depend upon the number of reactive sites available on the phenolic moiety of the product of the first step. The number of available sites will be dependent on such factors as the phenolic compound used, the ratio of TCPD to the phenolic compound and the number of substituents on the phenolic reactant. Normally the olefin is reacted with the product of the first step until no further reaction occurs, although less olefin may be used.

In the two-step process, the product of the first step can be stripped of excess phenolic reactant before the second step, but such stripping is not necessary.

The compounds of this invention are useful in protecting polymer in any form, e.g., polymer in latex form, unvulcanized polymer and vulcanized polymer. The method of addition of the antioxidant to the polymer is not critical. They may be added by any of the conventional means such as by adding to a polymer latex or cement, milling on an open mill or by internal mixing. They are highly efficient and are capable of being employed in relatively small amounts to effectively stabilize the polymers into which they are incorporated.

Polymers subject to deterioration by oxidation that can be conveniently protected by the age resisters described herein include substituted and unsubstituted, saturated and unsaturated, vulcanized and unvulcanized, natural and synthetic polymers. The oxidizable natural polymers of interest include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymers) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, butylacrylate, methyl vinyl ether, vinyl acetate and vinyl pyridine. Examples of vinylidene monomers are α-methylstyrene, methacrylic acid, methyl methacrylate, ethylmethacrylate, glycidylmethacrylate and vinylidene chloride. Representative examples of the synthetic polymers used in the practice of this invention are polychloroprene; homopolymers of a conjugated 1,3-diene such as isoprene and butadiene, and in particular polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene. Resins such as those described in U.S. Pat. No. 3,577,398 can also be protected.

The level of antioxidant necessary for measurable stabilization varies according to the nature of the polymer, the severity of the deteriorating conditions to which the polymer is exposed and the time it is exposed to such conditions. As is well known, unsaturated polymers such as natural rubber, SBR and polybutadiene are more susceptible to oxidative degradation than saturated polymers such as polyethylene and polypropylene, and therefore require higher amounts of antioxidant to achieve effective stabilization. An effective antioxidant amount of the disclosed antioxidants in unsaturated polymers will generally range from 0.05 to 5.0 parts by weight based on 100 parts by weight of the polymer, although it is commonly preferred to use from 0.25 or 0.5 part to 2.0 or 3.0 parts. In saturated polymers levels will range as low as 0.001 or 0.01 part. Normally amounts in excess of 1.0 part are unnecessary, although up to 5.0 parts and more can be used.

The Stage I products were prepared at 95° C. from the reaction of a phenolic with TCPD catalyzed by boron trifluoride ethyl etherate (BF$_3$·Et$_2$O). Phenolic:-diene starting molar ratios of 4:1 were employed. Stage II products were prepared by the reaction of Stage I with isobutylene or 2-methyl-1-pentene at 60°–80° C.

Two representative runs are described in detail below followed by a tabulation of phenolic:olefin ratio in products and oxygen absorption data from a number of reactions.

EXAMPLE 1

A mixture of 109.0 grams (1.008 mole) of p-cresol and 1.09 grams (2.03 ml.) BF$_3$·Et$_2$O (48% BF$_3$) was heated to 95° C. with rapid mechanical stirring. 50.0 grams (0.25 mole) of TCPD was then added dropwise at a rate sufficient to maintain a 95° C. reaction temperature with the heating mantle lowered. The solution became light orange after a few drops of TCPD had been added. Addition was complete within 22 minutes, at which time the solution was dark orange.

Stirring at 95° C. was continued for 15 minutes. 2.5 Grams of Ca(OH)$_2$ was then added. Stirring at 95° C. was continued for 15 minutes more. The viscous reaction mixture turned purple shortly after Ca(OH)$_2$ addition. Within 15 minutes the color changed to deep violet. Unreacted p-cresol was removed at 51°–54° C., 0.5 millimeter to leave an extremely viscous residue which was dissolved in toluene and filtered to remove Ca(OH)$_2$. Rotary evaporation of toluene yielded a viscous brown residue which hardened and could be crushed to a light brown powder. p-Cresol:TCPD ratio in the product was 1.84 based on recovered p-cresol.

The product was dissolved in toluene and butylated with isobutylene at 60°–80° C. with p-toluenesulfonic acid (TSA) catalyst. SBR containing 1 percent of this product absorbed 1.0 percent O$_2$ in 413.5 hours at 100° C.

EXAMPLE 2

A mixture of 122.17 grams (1.0 mole) of p-ethylphenol (purified by vacuum distillation) and 1.09 (2.03 milliliters) BF$_3$·Et$_2$O was heated to 95° C. with rapid mechanical stirring. 50.0 Grams (0.252 mole) of TCPD was then added dropwise. Within 20 seconds the almost colorless melt became very light orange. The solution continually darkened and became red-orange within 12 minutes. Addition was complete in 18 minutes. The bright red-orange solution was stirred for 15 minutes more at 95° C.

A distilling head was then added to the system and excess p-ethylphenol and BF$_3$·Et$_2$O were removed by vacuum distillation at pot temperature of 87°–190° C., column temperature of 67°–70° C., 0.1–1.5 millimeters. The color decreased to light yellow during distillation. 66.75 Grams of p-ethylphenol was recovered. 98.10 Grams of light yellow residue remained. It softens at 62° C. and melts at 90°–120° C. p-Ethylphenol:TCPD ratio in product was 1.82 based on recovered p-ethylphenol.

The product was dissolved in toluene and butylated with isobutylene at 60°–80° C. with p-toluenesulfonic acid (TSA) catalyst. SBR containing 1 percent of this product absorbed 1.0 percent oxygen in 209.9 hours.

| R.P. | ArOh/Olefin in Pdct | 1% in SBR Time to 1% O$_2$ |
|---|---|---|
| TCPD + p-cresol + isobutylene | 1.84 | 413.5 hr |
| TCPD + m- + p-cresol (50:50) + isobutylene | 1.85 | 375.5 |
| TCPD + 2-t-butyl-p-cresol | 1.48 | 421.9 |
| TCPD + p-ethylphenol Stage I | 1.82 | 209.9 |

-continued

| R.P. | ArOh/Olefin in Pdct | 1% in SBR Time to 1% $O_2$ |
| --- | --- | --- |
| TCPD + p-ethylphenol + isobutylene | 1.82 | 281.3 |
| TCPD + p-ethylphenol + 2-methyl-1-pentene | 1.82 | 242.1 |
| TCPD + phenol + isobutylene | 2.09 | 209.6 |
| Wing-Stay L Control | 1.5 | 399.5 |

The above data demonstrate the antioxidant activity of the compounds of the present invention.

The term "substituted aryl" as used herein refers to aryl radicals such as phenyl or naphthyl, containing 1 or 2 substituents selected from the group consisting of chloro, nitro, methyl and ethyl.

While certain representative embodiments and details have been shown for the purpose of illustrating the invention, it will be apparent to those skilled in this art that various changes and modifications may be made therein without departing from the spirit or scope of the invention.

We claim:

1. A reaction product prepared by reacting a mixture comprising (A) at least one phenolic reactant conforming to the following structural formula

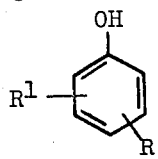

wherein R is selected from the group consisting of hydrogen, alkyl radicals having from 1 to 12 carbon atoms, cycloalkyl radicals having from 5 to 12 carbon atoms, aralkyl radicals having from 7 to 12 carbon atoms, substituted and unsubstituted aryl radicals having 6 to 12 carbon atoms, alkoxy radicals having from 1 to 12 carbon atoms, cycloalkoxy radicals having from 5 to 12 carbon atoms and aralkoxy radicals having from 7 to 12 carbon atoms and $R^1$ is selected from the group consisting of hydrogen and tertiary alkyl radicals having from 4 to 12 carbon atoms and (B) tricyclopentadiene, in the presence of a Friedel-Crafts catalyst, at a temperature of from 25° C. to 160° C. the molar ratio of the tricyclopentadiene compound to the phenolic reactant being from 1:1 to 1:10.

2. An alkylated reaction product prepared by reacting the reaction product of claim 1 with a tertiary olefin having 4 to 12 carbon atoms in the presence of an acidic alkylation catalyst at a temperature of from 20° C. to 100° C.

3. The reaction product according to claim 2 wherein $R^1$ is hydrogen.

4. A polymer subject to oxidation having incorporated therein the reaction product of claim 1.

5. A polymer subject to oxidation having incorporated therein the alkylated reaction product of claim 2.

* * * * *